Patented Oct. 21, 1924.

1,512,213

UNITED STATES PATENT OFFICE.

JUDSON A. DE CEW, OF MOUNT VERNON, NEW YORK, ASSIGNOR TO PROCESS ENGINEERS, INC., OF NEW YORK, N. Y., A CORPORATION OF NEW YORK.

PAPER-SIZING COMPOSITION.

No Drawing. Application filed February 9, 1923. Serial No. 618,123.

*To all whom it may concern:*

Be it known that I, JUDSON A. DE CEW, a citizen of Canada, residing at Mount Vernon, New York, have invented certain new and useful Improvements in Paper-Sizing Compositions, of which the following is a specification.

I have discovered that it is possible to incorporate into one soluble composition, certain sizing or waterproofing agents which, ordinarily when brought together, react on each other to form insoluble materials.

The compounds particularly referred to are sodium resinate and aluminum sulphate which are commonly used for sizing paper. By their use, a precipitate is formed in the pulp in the beating or mixing engine.

My present invention is to bring these two materials together in the presence of a colloid such as glue or starch, glucose, sulphite cellulose liquor, or similar protective colloids. This invention also includes the use of any soap which would be coagulated by an acid or an acid salt under ordinary conditions.

My method of procedure is to dissolve each reacting ingredient in one or more of these colloidal products, and then bring them together in such a manner that they do not form an insoluble product, because the product of reaction, if any, will remain in colloidal solution within the protective colloid. An example of this is to make a solution of glue in water and add to this from 5 to 10% of its weight of resin or other soap; and a similar glue solution containing from 5 to 10% of the weight of the glue of aluminum sulphate (alum) or acid salt. The two compounds are then mixed by degrees, the acid solution being added to the soap solution and it is found that no reaction takes place between the alum and the size.

This product is very useful as a coating for paper and will, when dried on the paper, form a strong, waterproof coating on the surface of the sheet. As already stated, other colloids than glue may be used for this purpose.

When such a product is dried, then the resin and alumina form an insoluble product which does not re-dissolve and therefore acts as a sizing material. This soluble sizing composition may also be used in the beating engine like ordinary rosin size and does not require any other agent as it will go directly into the fibres by absorption to form a coating which reduces their capillarity.

In compounding these ingredients, I prefer to add the colloidal solution containing the acid salt to the solution containing the soap for under these conditions, the soap is always in excess and there is less danger of coagulation. By this method a larger quantity of both soap and acid salt can be incorporated in the colloids without forming coagulation than if the ingredients are mixed in the other manner by adding the soap solution to the acid solution. By following this method of compounding materials, it is possible to use as high as ten parts of the reagents to ninety of the colloids used. By other methods of mixing the proportion of reagents should be nearly 5%.

What I claim is:

1. A sizing composition having therein substantially five parts of rosin size, approximately five parts of alum and approximately ninety parts of a starch product.

2. A sizing composition having therein approximately five parts of rosin size, approximately five parts of alum and approximately ninety parts of a starch product, all in aqueous colloidal solution.

3. A method of producing a colloidal solution of aluminum resinate which consists in dissolving a resin soap in a starch product, dissolving aluminum sulphate in a starch product, and then mixing the solutions together.

4. A method of incorporating an acid salt in a soap solution without coagulation, which consists in dissolving each reagent in an excess of a starch product and then adding the acid solution to the soap solution.

In testimony whereof I have affixed my signature to this specification.

JUDSON A. DE CEW.